(12) United States Patent
Lombrozo

(10) Patent No.: US 12,139,108 B1
(45) Date of Patent: Nov. 12, 2024

(54) CLEANING DEVICE FOR SPINNING SURFACE

(71) Applicant: WAYMO LLC, Mountain View, CA (US)

(72) Inventor: Peter Craig Lombrozo, Santa Cruz, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/991,970

(22) Filed: Nov. 22, 2022

Related U.S. Application Data

(63) Continuation of application No. 15/217,298, filed on Jul. 22, 2016, now Pat. No. 11,535,204.

(51) Int. Cl.
| | |
|---|---|
| *B60S 1/62* | (2006.01) |
| *B08B 1/14* | (2024.01) |
| *B08B 3/02* | (2006.01) |
| *B60S 1/04* | (2006.01) |
| *B60S 1/34* | (2006.01) |
| *B60S 1/56* | (2006.01) |
| *G02B 27/00* | (2006.01) |

(52) U.S. Cl.
CPC .............. *B60S 1/62* (2013.01); *B08B 1/143* (2024.01); *B08B 3/02* (2013.01); *B60S 1/0411* (2013.01); *B60S 1/3418* (2013.01); *B60S 1/566* (2013.01); *G02B 27/0006* (2013.01)

(58) Field of Classification Search
CPC .......... B60S 1/62; B60S 1/566; B60S 1/3418; B60S 1/0411; B08B 1/006; B08B 3/02; G02B 27/006
USPC ..... 15/97.3, 250.22, 250.1; 134/102.1, 99.2; 396/427
See application file for complete search history.

(56) References Cited

U.S. PATENT DOCUMENTS

| | | | |
|---|---|---|---|
| 4,963,929 A | 10/1990 | Ueda et al. | |
| 5,208,938 A | 5/1993 | Webb | |
| 6,527,000 B1 | 3/2003 | Randmae et al. | |
| 6,654,984 B2 * | 12/2003 | Hoshino | B60S 1/3874 15/250.43 |
| 7,627,235 B2 | 12/2009 | Mccutchen et al. | |
| 8,317,414 B2 | 11/2012 | Jones | |

(Continued)

FOREIGN PATENT DOCUMENTS

| | | |
|---|---|---|
| EP | 1353136 A2 | 10/2003 |
| GB | 2098467 A | 11/1982 |

(Continued)

*Primary Examiner* — Katina N. Henson
(74) *Attorney, Agent, or Firm* — Botos Churchill IP Law

(57) ABSTRACT

The technology relates to a system for cleating a sensor cover. The system may comprise a wiper comprising a wiper support, a wiper blade, and a sensor cover. The wiper blade may be configured to clear the sensor cover of debris, and the sensor cover may be configured to house one or more sensors. A wiper motor may rotate the wiper and a sensor motor may rotate the sensor cover. The system wiper blade may comprise a first edge attached to the wiper support and a second edge which may be configured to be in contact with the sensor cover. The wiper blade may extend in a corkscrew shape around the wiper support. The wiper motor may be configured to rotate the wiper in a first direction and the sensor motor may be configured to rotate the sensor cover in a second direction opposite the first direction.

20 Claims, 10 Drawing Sheets

(56) References Cited

U.S. PATENT DOCUMENTS

| | | |
|---|---|---|
| 8,406,673 B2 | 3/2013 | Rimai |
| 8,453,499 B2 | 6/2013 | Johannsen et al. |
| 8,567,963 B1 | 10/2013 | Criscuolo et al. |
| 2002/0017004 A1 | 2/2002 | Nakajima |
| 2011/0141562 A1* | 6/2011 | Okazawa ........... G02B 27/0006 |
| | | 359/507 |
| 2014/0036084 A1 | 2/2014 | Lu |
| 2015/0136385 A1 | 5/2015 | Ratcliffe et al. |

FOREIGN PATENT DOCUMENTS

| | | | |
|---|---|---|---|
| JP | 2004329497 A | | 11/2004 |
| JP | 2007195037 A | | 8/2007 |
| JP | 2008288720 A | * | 11/2008 |
| WO | 2015003705 A1 | | 1/2015 |

* cited by examiner

CLEANING DEVICE FOR SPINNING SURFACE

CROSS-REFERENCE TO RELATED APPLICATIONS

This application is a continuation of U.S. application Ser. No. 15/217,298, filed Jul. 22, 2016, the entire disclosure of which is incorporated by reference herein.

BACKGROUND

Vehicles are often subjected to environmental elements such as rain, snow, dirt, etc. Such environmental elements may cause a buildup of debris and contaminants on components of the vehicles, such as on sensors of the vehicle. The vehicle sensors may each include a cover to protect the internal sensor components from the debris and contaminants, but the cover itself may become dirty over time. As such, the functions of the internal sensor components may be impeded as signals transmitted and received by the internal sensor components may be blocked by the debris and contaminants.

SUMMARY

Embodiments within the disclosure relate generally to a system for clearing a sensor cover. One aspect includes a wiper comprising a wiper support and a wiper blade. The sensor cover may be configured to house one or more sensors and a sensor motor may be used for rotating the sensor cover. The wiper blade may clear the sensor cover of debris.

In some embodiments, a first edge of the wiper blade attached to the wiper support and a second edge of the wiper blade configured to be in contact with the sensor cover.

In some embodiments, the wiper blade may extend in a corkscrew shape around the wiper support.

In some embodiments, the system may further comprise a wiper motor configured to rotate the wiper in a first direction and the sensor motor may be configured to rotate the sensor cover in a second direction opposite the first direction.

In some embodiments, the wiper motor is configured to rotate the wiper at a first speed and the sensor motor is configured to rotate the sensor cover at the first speed.

In some embodiments, the wiper blade is configured to clear the sensor cover by wiping the sensor cover in the second direction.

In some embodiments, the wiper may be configured to be positioned during operation such that the wiper blade is both in contact with the cover of the sensor and outside of a field of operation of the one or more sensors.

In some embodiments, when the wiper is not being used, the wiper may be configured to retract away from the sensor cover.

In some embodiments, the wiper may be configured to retract away from the sensor cover by receding into the interior of the vehicle.

In some embodiments, the system may further comprise a jet configured to project a liquid onto the sensor cover.

In some embodiments, the wiper blade may be configured to conform to irregular sensor cover shapes.

In some embodiments, the system may further comprise a monitoring sensor, wherein the monitoring sensor may be configured to detect the drag caused by the second end of the wiper blade contacting the sensor cover.

In some embodiments, the system may further comprise a monitoring sensor, wherein the monitoring sensor may be configured to adjust the speed of the sensor motor to compensate for the drag caused by the second end of the wiper blade contacting the sensor cover.

In some embodiments, the wiper blade comprises more than one wiper blades.

In some embodiments, the more than one wiper blades may be vertical wiper blades and each vertical wiper blade may be attached to the wiper support.

In some embodiments, the wiper support may include one or more rollers and a track.

In some embodiments, the wiper blade may comprise one or more wiper blades configured on the exterior of the track.

In some embodiments, the system may further comprise a wiper motor configured to rotate the track around the one or more rollers.

In some embodiments, the one or more wiper blades may be configured to clear the sensor cover by wiping the sensor cover in a direction towards the ground.

In some embodiments, the wiper support may be supported by a bearing and is configured to cause rotation of the wiper at a first speed by friction when placed in contact with the surface of the sensor cover at the first speed.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Figure 1:
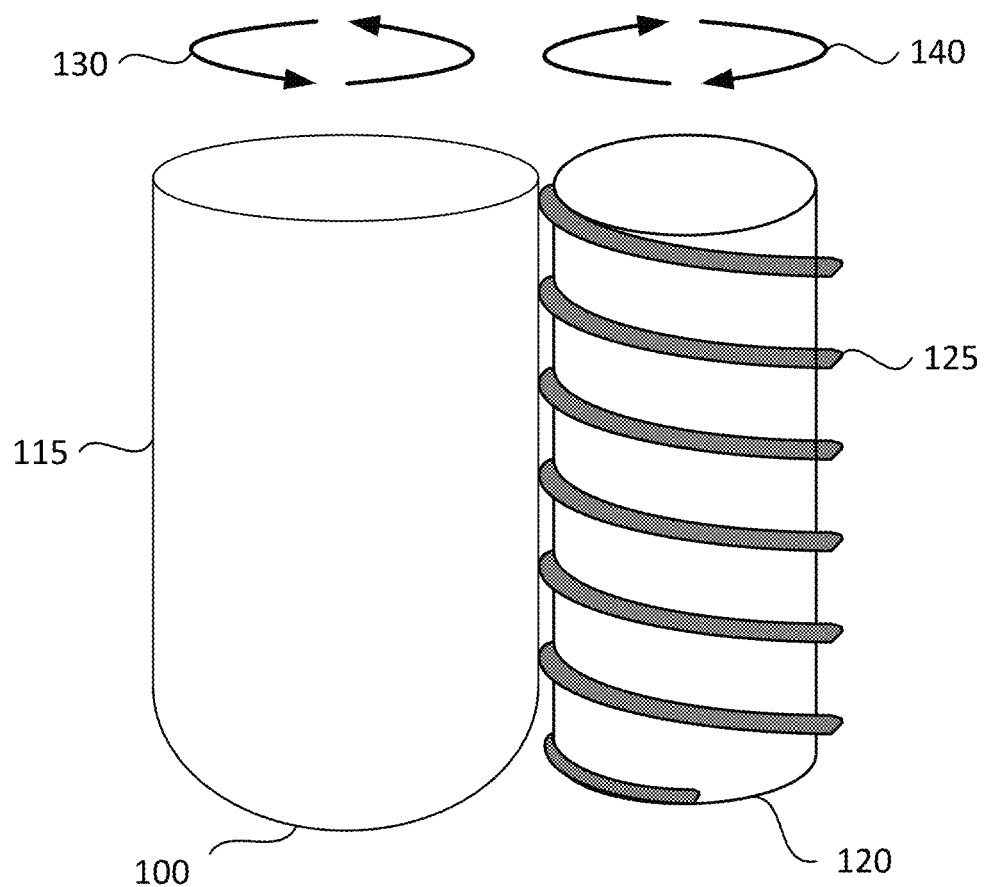
FIG. 1 is an illustration of a sensor and wiper in accordance with aspects of the disclosure.

This technology relates to clearing vehicle sensors of debris and contaminants to assure adequate operation. Sensors, such as sensors on the exterior of a vehicle, may include a cover to protect the internal sensor components from the debris and contaminants, but the cover itself may become dirty over time. As such, the functions of the internal sensor components may be impeded as signals transmitted and received by the internal sensor components may be blocked by the debris and contaminants. To address these issues, debris may be cleared from a sensor by rotating the sensor and/or wiping the cover with a wiper. For instance, as shown in FIG. 1 the cover 115 of the sensor 100 may be rotated in a first direction 130 against a wiper blade 125 of a wiper 120 which may be rotated in a second direction 140 to loosen, pull and push away the debris built up on the cover.

A vehicle sensor may be comprised of internal sensor components, a cover for housing the internal sensor components, and a cover window. The cover window may be constructed at a specific location on the sensor cover and the internal sensor components may transmit and receive one or more signals through the cover window.

The sensor may be attached to a motor via a sensor shaft. In this regard, a first end of a sensor shaft may be attached to a first motor and the opposite end of the sensor shaft may be connected to the sensor and cover. Upon the first motor rotating the sensor shaft, the entire sensor may also rotate.

The wiper may be comprised of one or more wiper blades and a wiper support. The one or more wiper blades may be in the form of a corkscrew and attached to the wiper support.

The wiper support may be attached to a second motor via a wiper shaft. In this regard, a first end of the wiper shaft may be attached to a second motor and the opposite end of the wiper shaft may be connected to the wiper support. The second motor may rotate the wiper shaft in a second direction causing the wiper to also rotate in the second direction.

The edge of the wiper blade may be constructed such that it extends horizontally outwards from the shaft. When the wiper blade makes contact with the sensor cover, the wiper blade may be deformed in a slight downward position relative to the top of the wiper support and when the wiper blade is no longer in contact with the sensor cover the wiper blade may return to its original shape.

The first and second motors may rotate the sensor and the wiper at the same time. As the motors rotate the wiper and sensor, the edges of the wiper blade may be deflected in a downward direction relative to the top of the shaft and causing a downward force to be applied against the sensor cover. The downward force may cause debris and contaminants on the exterior of the cover to be pushed progressively to the bottom of the cover.

The shaft and wiper blade may be positioned such that the wiper blade is in contact with the cover, but outside of the field of operation of the sensor. As such, the signals being transmitted and received by the sensor are not blocked by the wiper. In some embodiments the sensor and the wiper may be rotated at the same speed so to minimize scan speed variations which may be caused by the rotation of the sensor being slowed due to contact with the wiper.

In some embodiments, the wiper may be engaged such that the wiper may be placed adjacent to, and in contact with the cover. When the wiper is disengaged, such that the wiper is not being used or needed to clear the sensor of debris, the wiper may retract into the body of the vehicle or be positioned away from the sensor.

A jet may assist in the removal of the debris and contaminants from the sensor cover. In this regard, the jet may apply a cleansing solution, such as water or detergent, onto the cover to loosen the debris and aid the wiper blade in clearing the cover of the debris.

In some embodiments the wiper may include more than one wiper blade, such as multiple vertical wiper blades. A wiper comprising multiple vertical wiper blades may rotate slower or faster than the sensor cover of the sensor to cause the wiper blades to scrape the sensor cover, thereby clearing the cover window free of debris. In other embodiments the wiper blades could be attached to a vertical belt and rollers, controlled by a motor, may rotate the belt such that the blades move in a downward direction along the sensor cover as the sensor cover rotates.

A sensor may monitor the drag caused by the wiper blade contacting the sensor cover. Based on the determined drag, the speed of the motor rotating the sensor may be increased or decreased to assure a consistent scan speed of the sensor.

The features described herein may allow for continued use of a sensor even when the sensor's cover becomes dirty. By doing such, the sensor may continue operation without interruption or the need for an individual to manually clean the sensor, as the wiper may continually clean the sensor cover or clean the sensor cover when needed. As such, the vehicle may continually operate in environments which produce a lot of debris, such as construction sites or off-road locations.

Figure 2:
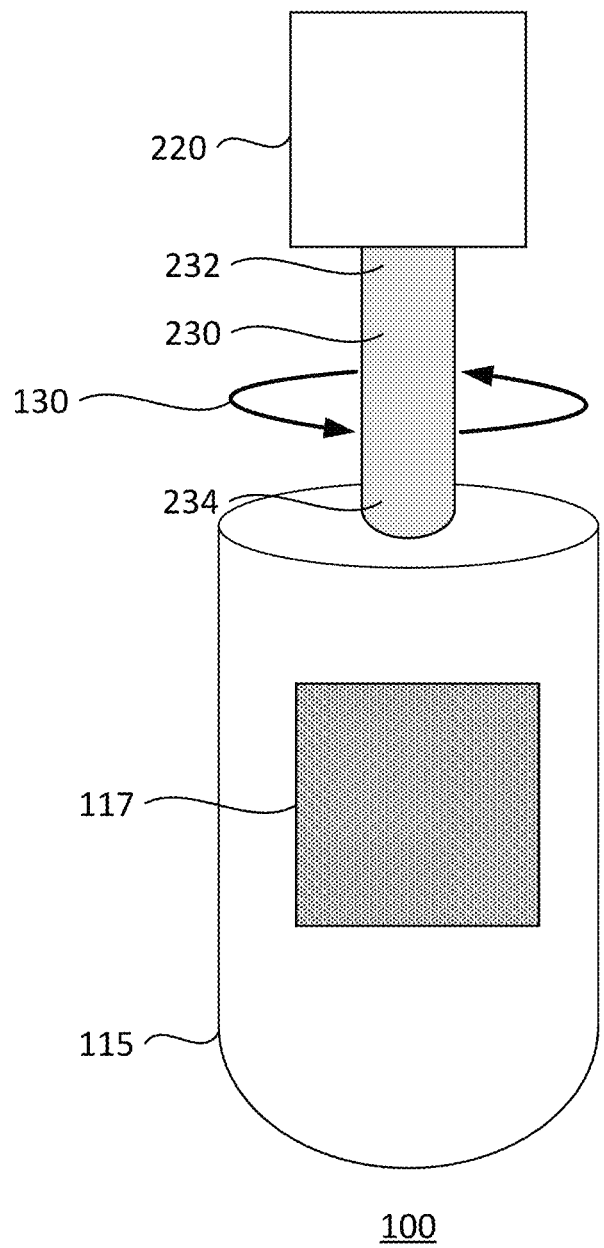
FIG. 2 shows a sensor attached to a motor in accordance with aspects of the disclosure.

The vehicle sensor may be configured to transmit and receive signals. For instance, as shown in FIG. 2, the vehicle sensor 100 may be comprised of a cover 115 for housing internal sensor components (not shown), and a cover window 117. The internal sensor components may transmit and receive one or more signals through the cover window 117. The vehicle sensor may include one or more LIDAR, radar, sonar, cameras, or other sensors.

The cover window may be constructed in a particular shape, and be constructed at a specific location on the sensor cover. For example, as further shown in FIG. 2, the cover window 117 may be constructed as a square window located on the side of the sensor cover 115, though various other shapes may also be used. The cover window 117 may be composed of the same, or different, material as the sensor cover 115, such as plastic, glass, polycarbonate, polystyrene, acrylic, polyester, etc. In some embodiments the entire sensor cover 115, or a large portion of the sensor cover, may be penetrable by the signals transmitted and received by the internal sensor components, thereby allowing the entire sensor cover to operate as a cover window.

The sensor may be attached to a motor via a sensor shaft. For instance, as further shown in FIG. 2, the sensor shaft 230 may include a first end 232 and a second end 234. The first end of the of a sensor shaft 232 may be attached to a first motor 220 and the opposite end of the sensor shaft 234 may be connected to the sensor 100 and sensor cover 115. In this regard, the first end of the sensor shaft 232 may be attached to the first motor 220 via a belt, gear, chain, friction roller, etc. The first motor 220 may rotate the sensor shaft 230 in the first direction 130 causing the entire sensor 100 to also rotate in the first direction. In some embodiments the sensor shaft may only rotate the sensor cover 115. The sensor 100 and first motor 220 may each be located internally or externally from a vehicle.

Figure 3:
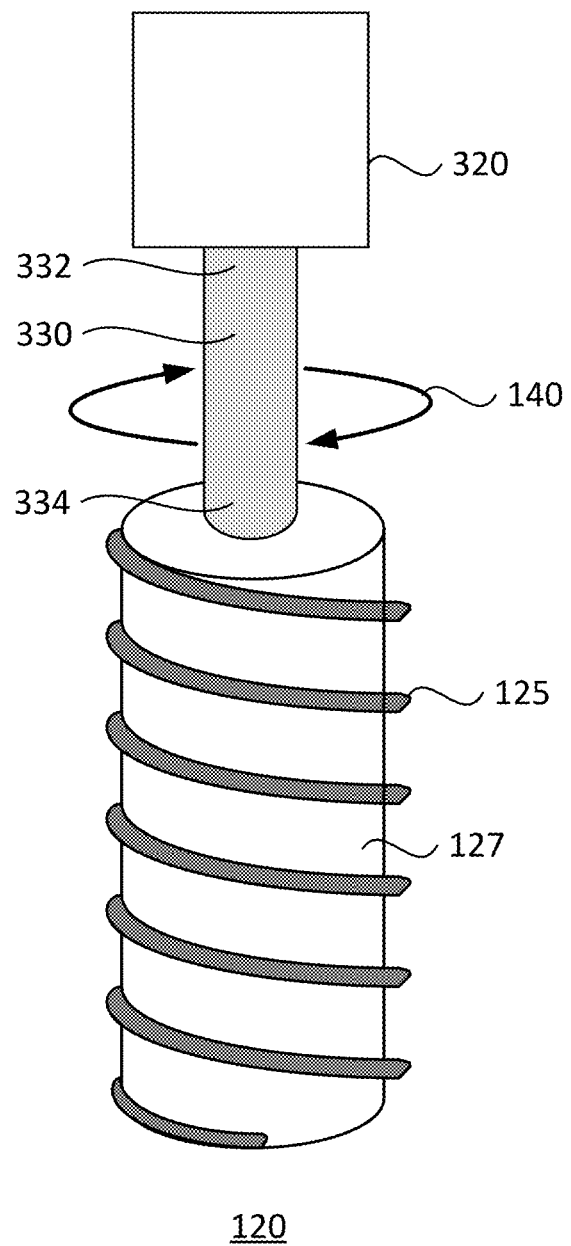
FIG. 3 shows a wiper, with a wiper blade, attached to a motor in accordance with aspects of the disclosure.

The wiper may be comprised of one or more wiper blades and a wiper support. For instance, as shown in FIG. 3, a wiper blade 125 may be in the form of a corkscrew and attached to a wiper support 127. The wiper blade 125 may be comprised of materials capable of removing debris, such as rubber (e.g., buna, ethylene propylene diene monomer (EPDM), silicone, etc.) or plastic (urethane, polyethylene, etc.). The wiper blades 125 may also be comprised of a solid or sponge-like foam or fabric (e.g. woven fabric, felted fabric, etc.). In some embodiments multiple corkscrew blades may be attached to the wiper support 127.

The wiper support may be attached to a second motor via a wiper shaft. For instance, as further shown in FIG. 3, a first end of the wiper shaft 332 may be attached to the second motor 320 and the opposite end of the wiper shaft 334 may be connected to the wiper support 127. In this regard, the first end of the wiper shaft 332 may be attached to the second motor 320 via a belt, gear, chain, friction roller, etc. The second motor 320 may rotate the wiper shaft 330 in a second direction 140 causing the wiper 120 to also rotate in the second direction. In some embodiments the second motor 320 may be the same as the motor which rotates the sensor 100. In other embodiments, the wiper 120 may not be directly coupled to a motor, rather the wiper support 127 may be attached to a bearing, such as a ball bearing. The wiper support 127 may rotate around the bearing due to contact friction between the wiper blade 125 and the sensor cover. In other words, the sensor cover may be rotated by the first motor and the friction caused by the rotation of sensor cover 115 rubbing against the wiper blade may cause the wiper to rotate.

Figure 4:
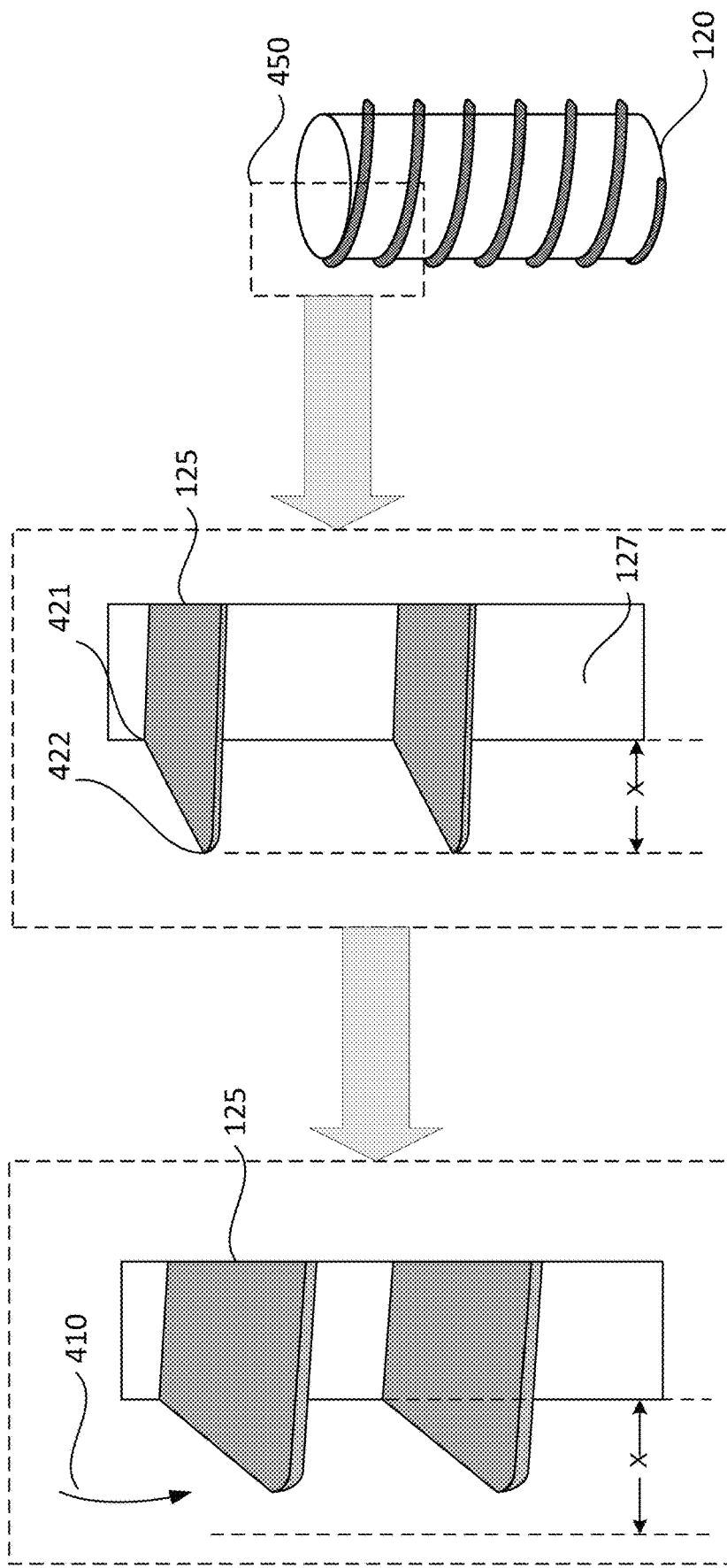
FIGS. 4A-4C are illustrations of a wiper blade in accordance with aspects of the disclosure.

The edge of the wiper blade may be constructed such that it extends outwards from an external surface of the shaft. For example, a portion of the wiper 120, outlined by box 450, as shown in FIG. 4A, is shown in an expanded view in FIGS. 4B and 4C. The wiper blade may include a first edge 421, which is attached to the support 127, and a second end 422, which is free floating, as shown in FIG. 4B. As further shown in FIG. 4B, the initial distance the wiper blade 125 extends away from the support 127. 'X', may be greater than the distance from the edge of the support 127 to the sensor cover 115 when the wiper 120 is positioned next to the sensor 110, as described in detail below.

When the wiper blade makes contact with the sensor cover, the wiper blade may be deformed in a slight downward position relative to the top of the wiper support. For instance, as shown in FIG. 4C, when the wiper blade 125 is in contact with the sensor cover 115, the wiper blade may be deformed in a downward position due to the force introduced by the sensor cover 115 contacting the wiper blade 125, as indicated by direction arrow 410. The initial distance the wiper blade extends away from the support 127 may then be reduced. The deformable wiper blade may allow the wiper blade 125 to contact sensor covers which are of an irregular shape, such as non-circular, elliptical, etc.

When the wiper blade is no longer in contact with the sensor cover the wiper blade may return to its original shape, as shown in FIG. 4B. In this regard, the angle of the viper blade 125, between the first edge 421 and the second edge 422, relative to the wiper shaft is between 5 degrees and 45 degrees, or more or less. The angle may be dependent upon on the length of the wiper blade 125, the thickness of the wiper blade, and the distance between the sensor cover 115 and the wiper support 127. For instance, the viper blade 125 may be configured such that each portion of the wiper blade in contact with the sensor cover 115 does not contact each other when they are deformed.

The diameter of the wiper blade 125 may be different and not an even multiple of the diameter of the sensor cover 115. For instance, the wiper blade 125 having a different, non-even multiple diameter of the sensor cover 115 may contact different areas of the sensor cover 115 with each rotation. The diameter of the wiper in this context is defined as twice the distance from the sensor cover surface to the wiper support rotation axis, accounting for the flexed wiper blades. More blades in simultaneous contact with the sensor cover will create more lateral force against the sensor which may move it further out of alignment, which is undesirable.

Figure 5:
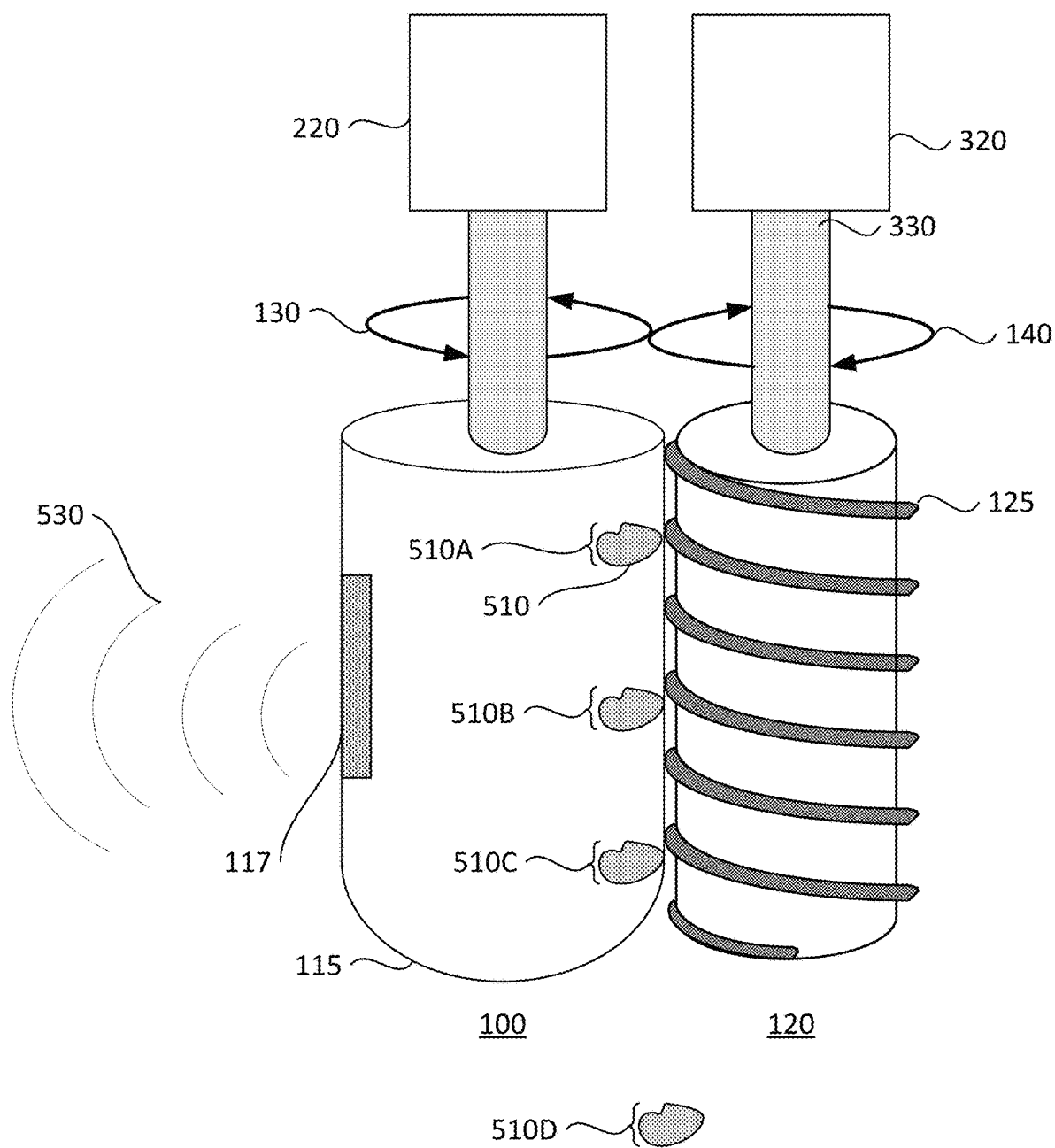
FIG. 5 is an illustration of a wiper removing debris from a sensor in accordance with aspects of the disclosure.

The motors may rotate the sensor and the wiper at the same time. For example, as shown in FIG. 5, the first motor 220 may rotate the sensor 100 in the first direction 130 and the second motor 320 may rotate the wiper 120 in a second, opposite direction 140. As the motors rotate the wiper 120 and sensor 100 or the wiper and sensor cover 115, the edges of the wiper blade 125 may be deflected in a downward direction relative to the top of the shaft 330 and causing a downward force to be applied against the sensor cover 115.

The downward force may cause debris and contaminants on the exterior of the sensor cover to be pushed progressively to the bottom of the cover. For instance, as further shown in FIG. 5, contaminant 510 may be progressively pushed to the bottom of the cover by the downward force the generated by the wiper blade 125 rubbing again the sensor cover 115 and/or cover window 117. In this regard, contaminant 510 may progressively move from position 510A, through positions 510B and 510C. The contaminant 510 may be ejected from the sensor cover 115, as shown by the contaminant 510 being located at position 510D. As a result, the sensor 100 may transmit signals 530 through the cover window 117, without the signals being impeded by the contaminant 510. Gravity may amplify the downward force applied on the contaminant 510.

The shaft and wiper blade may be positioned adjacent to each other at a position and distance which minimizes the effect of the location of the wiper on the operation of the sensor. For instance, as further shown in FIG. 5, the wiper 120 may be positioned such that the wiper blade 125 is in contact with the sensor cover 115, but outside of the field of operation of the sensor 100. In this regard the wiper may be positioned such that the signals 530 being transmitted and received by the sensor 100 are not blocked by the wiper 120. As further shown in FIG. 5, the wiper 120 may be positioned at the side opposite of where the sensor 100 transmits the signals 530.

In some embodiments the sensor and the wiper may be rotated at the same speed so to minimize scan speed variations which may be caused by the rotation of the sensor being slowed due to contact with the wiper. In this regard, when the sensor cover 115 and wiper 120 rotate at the same surface speed there may be a minimization of torque or drag affected on the sensor cover and first motor 220 by the wiper and the second motor 320. As such, the sensor 100 may maintain a consistent scan speed. In some embodiments the wiper blade 125 may have little to no pitch (i.e., positioned close to vertical), thereby further reducing the surface area of the wiper blade which is in contact with the sensor cover 115. As such, the drag created by the wiper blade 125 on the sensor 100 may be reduced.

Figure 6A:
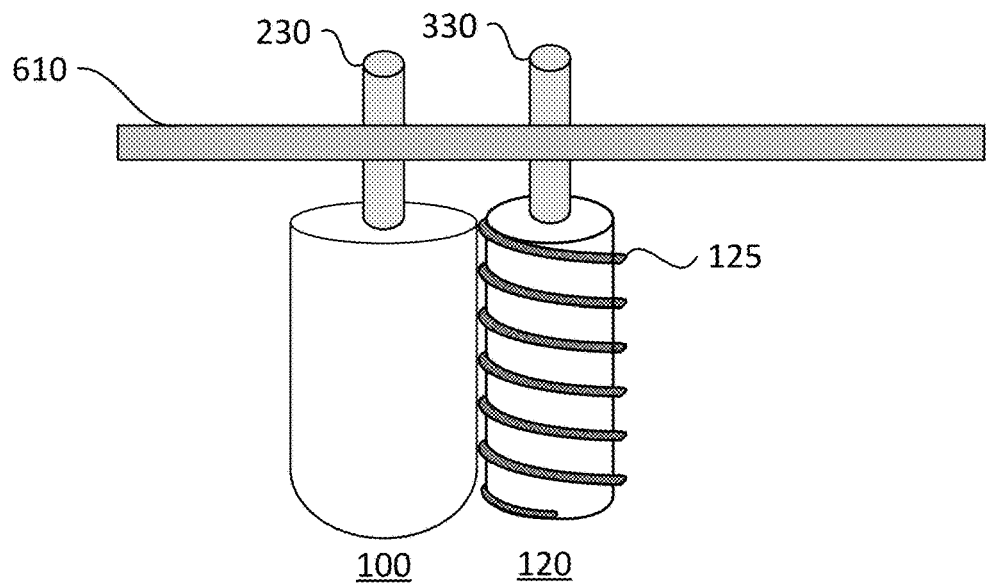
FIGS. 6A and 6B show a wiper being engaged and disengaged in accordance with aspects of the disclosure.
Figure 6B:
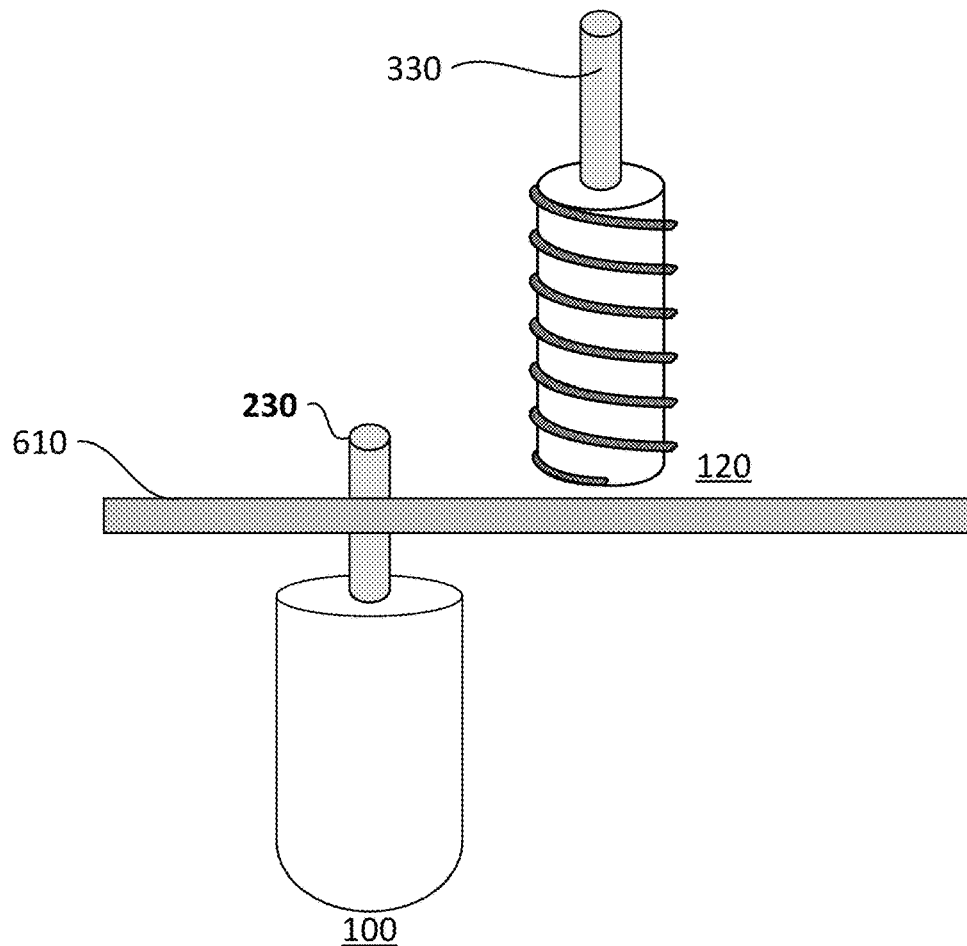
Figure 7A:
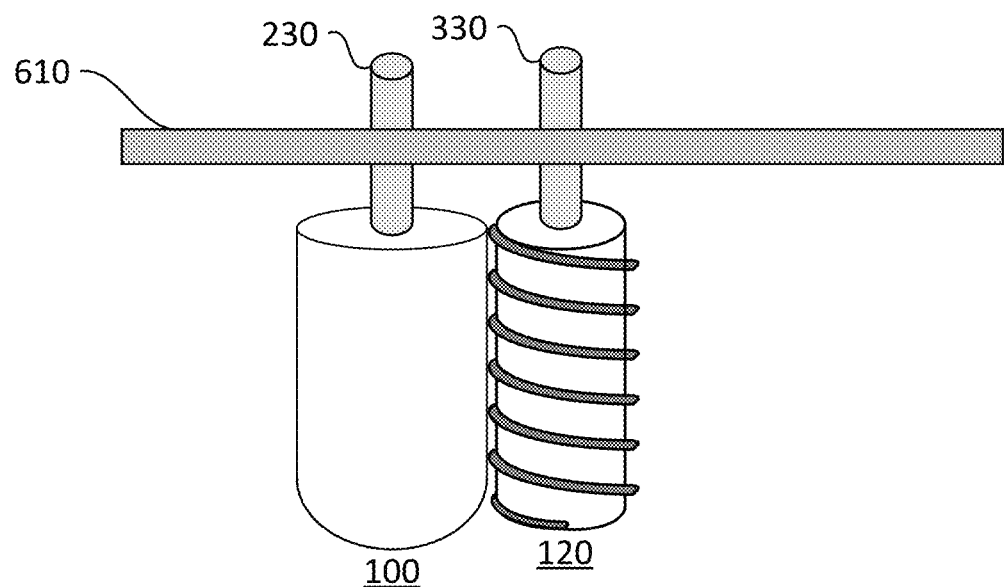
FIGS. 7A and 7B show a wiper being engaged and disengaged in accordance with aspects of the disclosure.
Figure 7B:
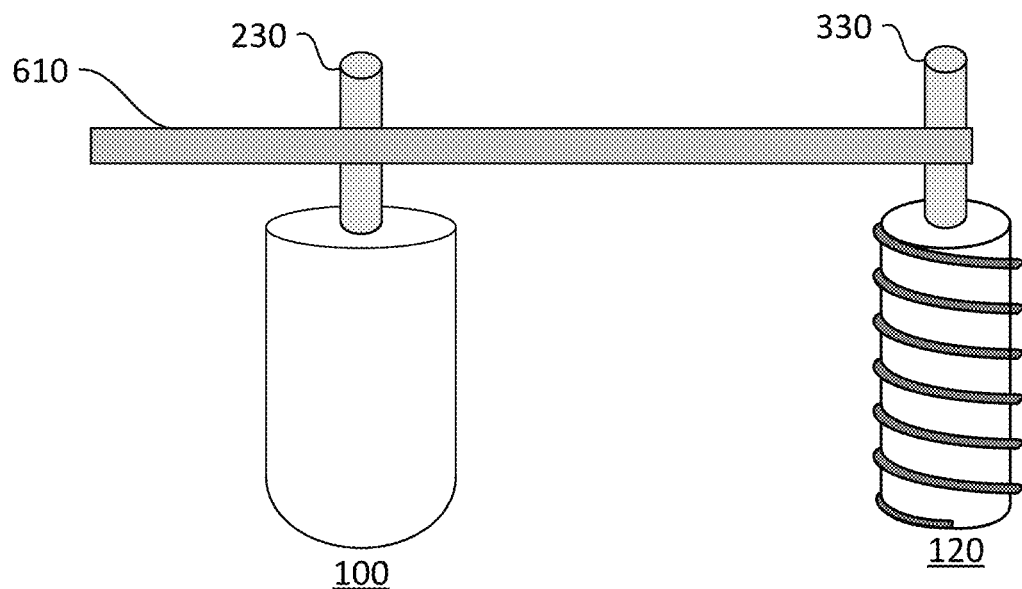

The wiper may be engaged and disengaged. In this regard, when the wiper is engaged, as shown in FIGS. 6A and TA, the wiper 120 may be placed adjacent to, and in contact with the sensor 100. When the wiper 120 is disengaged, such that the wiper is not being used, or needed to clear the sensor 100 of debris, the wiper 120 may retract into the body of the vehicle 610, as shown in FIG. 6B. In some embodiments when the wiper 120 is disengaged, the wiper 120 may be remain on the exterior of the body of the vehicle 610 and be positioned away from the sensor 100, as shown in FIG. 7B.

In some embodiments a debris sensor may monitor the sensor cover. In this regard, the debris sensor may monitor the sensor cover to determine whether contaminants or debris are present on the sensor cover 115. Upon determining a threshold number of contaminants or debris are present on the sensor cover, the debris sensor may provide a signal to engage the wiper 120. Upon determining the sensor cover is clear of debris, or the debris level on the sensor cover 115 is below a predetermined threshold, the debris sensor may signal the wiper 120 to disengage.

Figure 8:
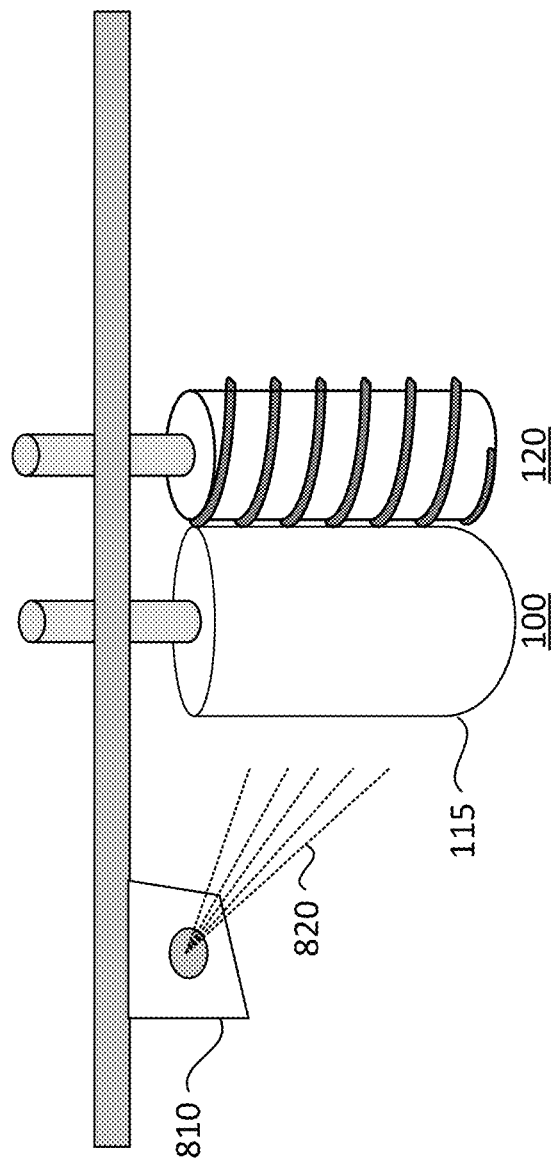
FIG. 8 shows a jet positioned in the range of operation of a sensor in accordance with aspects of the disclosure.

A jet may apply a cleansing solution, such as water or detergent, onto the cover to assist in the removal of the debris and contaminants from the sensor cover. For example, as shown in FIG. 8, a jet 810 may be positioned outside of the range of operation (or field of view) of the sensor 100. When the wiper 120 is engaged, the jet 810 may spray a stream of cleansing solution 820 onto the sensor cover 115. The wiper 120 may then clear the sensor cover of the debris, contaminants, and cleansing solution.

Figure 9:
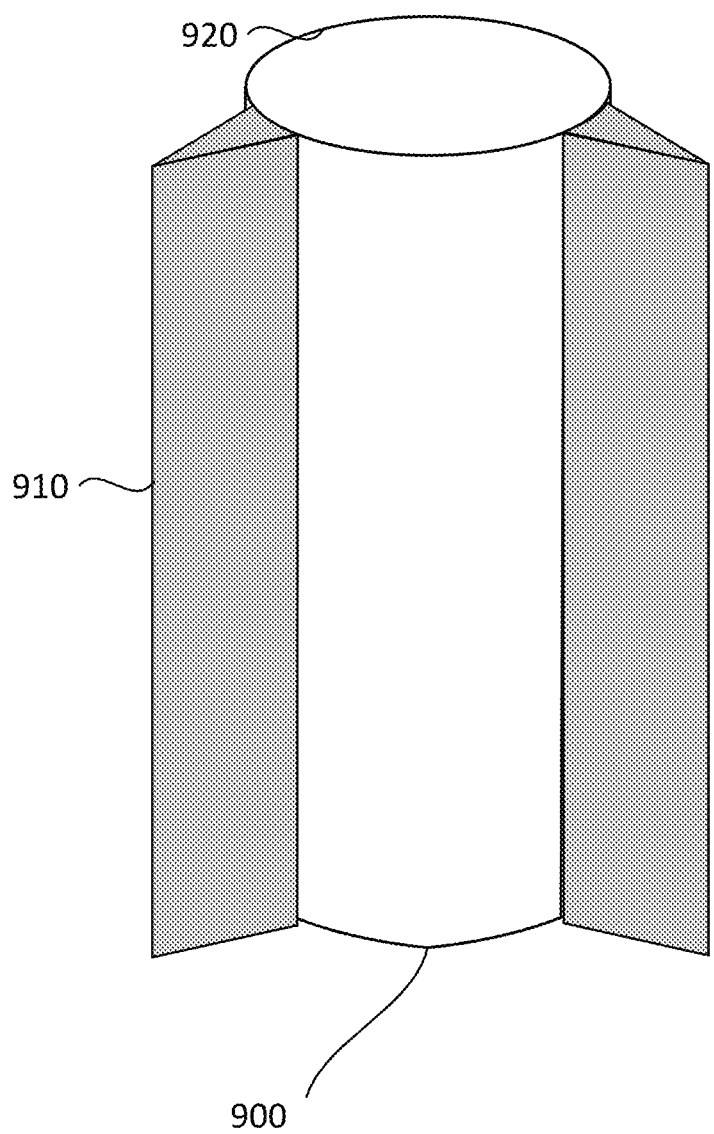
FIG. 9 shows an alternative wiper blade orientation in accordance with an embodiment.

In some embodiments the wiper may include more than one wiper blade. For example, as shown in FIG. 9, a vertical wiper 900 may contain multiple vertical wiper blades 910 attached to a vertical wiper support 920. A vertical wiper 900 comprising multiple vertical wiper blades 910 may rotate slower or faster than the sensor cover of the sensor to cause the wiper blades to scrape varying portions the sensor cover, thereby clearing most, or all, of the cover window free of debris.

Figure 10:
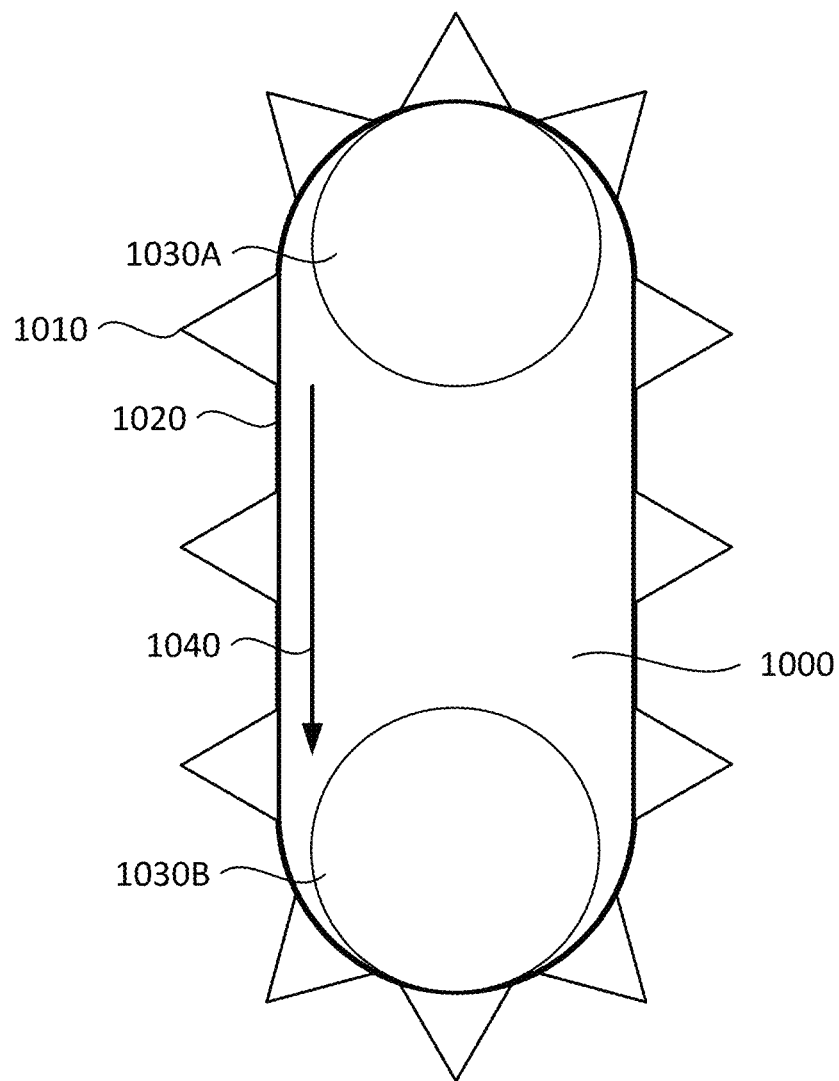
FIG. 10 shows wiper blades attached to a track in accordance with an embodiment.

In some embodiments the wiper blades could be attached to a wiper via a belt. For instance, as shown in FIG. 10, a track wiper 1000 may contain multiple blades 1010. The blades may be attached to a track belt 1020. Wiper supports, such as rollers 1030A and 1030B, may be controlled by a motor, and may rotate the track belt 1020 such that the blades 1010 move in a downward direction 1040 along the sensor cover as the sensor cover rotates. In this regard, the drag on the sensor cover may be low due to the reduced contact area of the wiper blades in contact with the sensor cover. Additionally, the downward motion 1040 of the wiper blades 1010 may further reduce the drag in comparison with a wiper blade which is rotated in an opposite direction of the rotation of the sensor cover.

While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trains, golf carts, trains, and trolleys.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for cleaning a sensor cover, the system comprising:
   a wiper comprising a wiper support and a wiper blade;
   the sensor cover configured to house one or more sensors therein; and
   a sensor motor configured to rotate the sensor cover in a selected sensor direction;
   wherein:
   the wiper is configured to rotate in a selected wiper direction when in contact with the sensor cover due to friction caused by rotation of the sensor cover; and
   during rotation the wiper blade is configured to clear the sensor cover of debris such that the wiper blade is both in contact with the sensor cover and outside of a field of operation of the one or more sensors.

2. The system of claim 1, further comprising a debris sensor configured to monitor the sensor cover to determine whether debris is present the sensor cover.

3. The system of claim 2, wherein the debris sensor is further configured to generate a signal to engage the wiper to the sensor cover upon detecting a threshold amount of debris is present on the sensor cover.

4. The system of claim 1, wherein a first edge of the wiper blade is attached to the wiper support and a second edge of the wiper blade is configured to be in contact with the sensor cover.

5. The system of claim 1, wherein when the wiper is not being used, the wiper is configured to retract away from the sensor cover.

6. The system of claim 5, wherein the wiper is configured to retract away from the sensor cover by receding into an interior of a vehicle.

7. The system of claim 1, further comprising a jet configured to project a liquid onto the sensor cover.

8. The system of claim 7, wherein the jet is disposed outside of the field of operation of the one or more sensors.

9. The system of claim 1, wherein the wiper blade comprises a plurality of wiper blades.

10. A system for clearing a sensor cover, the system comprising:
    a wiper comprising a wiper support and a wiper blade with a first edge attached to an external surface of the wiper support and a second edge extending outwards from the external surface of the wiper support in a radial direction, wherein the first and the second edge define an angle relative to the wiper support; and
    the sensor cover is configured to house one or more sensors therein;
    wherein the wiper blade is configured to be deformed from an initial distance to a reduced distance when in contact with the sensor cover; and
    wherein the wiper blade is configured to clear the sensor cover of debris such that during operation the wiper blade is both in contact with the sensor cover and outside of a field of operation of the one or more sensors.

11. The system of claim 10, wherein the wiper blade extends in a corkscrew shape around the wiper support.

12. The system of claim 11, wherein the wiper blade is configured to deform when in contact with the sensor cover such that different portions of the wiper blade in contact with the sensor cover do not contact one another.

13. The system of claim 10, further comprising:
    a cover window of the sensor cover through which the one or more sensors are configured to transmit or receive signals;
    wherein the wiper is positioned along a side opposite the cover window during operation of the wiper.

14. The system of claim 10, wherein the angle of the first and the second edge relative to the wiper support is between 5 degrees and 45 degrees.

15. The system of claim 10, wherein during operation of the wiper, the wiper is positioned such that a distance between the external surface and the sensor cover is less than the initial distance.

16. The system of claim 10, wherein the wiper blade is configured to conform to an irregular cover shape.

17. The system of claim 10, further comprising:

a wiper motor configured to rotate the wiper in a selected wiper direction; and a sensor motor for rotating the sensor cover in a selected sensor direction.

18. The system of claim 17, wherein the selected wiper direction is a first direction and the selected sensor direction is a second direction opposite the first direction.

19. The system of claim 18, wherein the wiper motor is configured to rotate the wiper at a first speed and the sensor motor is configured to rotate the sensor cover at the first speed.

20. The system of claim 10, wherein the wiper blade is configured to rotate at the same time that the sensor cover rotates.

* * * * *